April 26, 1966

R. O. YAVNE 3,247,723

ACCELEROMETER, GRAVITY METER AND
GAS FLOW RESPONSIVE INSTRUMENT

Filed July 20, 1964

*INVENTOR.*
RAPHAEL O. YAVNE

BY Paul Maleson
ATTORNEY

April 26, 1966  R. O. YAVNE  3,247,723
ACCELEROMETER, GRAVITY METER AND
GAS FLOW RESPONSIVE INSTRUMENT
Filed July 20, 1964  2 Sheets-Sheet 2

INVENTOR
RAPHAEL O. YAVNE
BY
Paul Maleson
ATTORNEY

United States Patent Office 3,247,723
Patented Apr. 26, 1966

3,247,723
ACCELEROMETER, GRAVITY METER AND
GAS FLOW RESPONSIVE INSTRUMENT
Raphael O. Yavne, 1001 Haral Place, Haddontowne,
Cherry Hill, N.J.
Substituted for abandoned application Ser No. 744,719,
June 26, 1958. This application July 20, 1964, Ser.
No. 386,811
7 Claims. (Cl. 73—516)

This is a substitute application for U.S. patent application Serial No. 744,719, abandoned prior to July 20, 1964.

In its broadest sense, this invention relates to an instrument for measuring the rate of flow of a gas past a point. More particularly, this invention relates to the utilization of this measurement principle in an accelerometer, gravity meter, or vertical measuring instrument.

Embodied as a gravity meter, this invention is useful for making comparative measurements of the force of gravity, commonly known as the "gravity-constant" and identified as "$g$" as it varies over different areas of the earth. A particularly valuable use of such a gravity meter is in geodetic surveys and geological surveys, as in locating the salt domes which are often indicative of a subterranean deposit of oil. The presence of subterranean structures such as salt domes produces slight variations in $g$ at that point as compared to $g$ at other points on the earth's surface. As will be seen, the physical characteristics of this gravity meter makes it particularly suitable for underwater geological surveys. This instrument has a high sensitivity for its weight and cost. The operative principle of this invention may be embodied in an instrument which can measure gravity to within approximately 1-milligal or better.

The principle herein disclosed may be embodied in an accelerometer, as is described below. The accelerometer may be made one, two or three dimensional. By integrating the acceleration information supplied by the instrument, velocity is determined; by double integration, distance travelled is determined. Such methods of handling accelerometer outputs are well known in the art. This accelerometer is useful in many fields of navigation, particularly inertial and celestial navigation which have exacting performance requirements. Accurate accelerometers are valuable in aircraft navigation and in the guidance of manned and unmanned vehicles of all types, as well as in testing. This instrument may be embodied in a form so as to indicate deviation from a true vertical position. Such an embodiment is valuable in providing stabilized platforms, which are useful in fire control and in navigation. A particular advantage of this instrument, in addition to its sensitivity, is the fact that it may be embodied in a physically small, light, simple form, which is an extremely valuable attribute in many applications.

Throughout this specification, the instrument will be described as an accelerometer, since this is its broadest field of use and because broadly speaking, its other functions may be described as measurements of acceleration. All accelerometers utilize the principle that different masses have different inertias. This is a broad description of the accelerometer principle, but is believed to apply to all known types including strain gauge accelerometers, or accelerometers using piezoelectric crystals. Broadly, this invention provides two different masses and a method and apparatus for transducing an acceleration acting on them. This apparatus and method provide great sensitivity and accuracy as well as advantages in physical size, weight and reliability.

It is an object of this invention to provide a device and method for measuring the flow of gases.

It is an object of this invention to provide two quantities of gases of different masses and means to measure the effect of an acceleration or gravity on these masses and to translate said effect into an electrical signal.

It is yet another object of this invention to provide a relatively hot mass of gas, a relatively cold mass of gas, a partition between said masses, two parallel slots in said partition, a resistance wire in each said gap, a means to provide a current in each said wire, and a means to measure the differential resistance of the said wires.

A still further object of this invention is to provide an accelerometer utilizing a differential heating and cooling effect on temperature responsive resistance wires.

A still further object of this invention is to provide a gravity meter utilizing a differential heating and cooling effect on temperature responsive resistance wires.

Yet another object of this invention is to provide a vertical-measuring instrument utilizing a differential heating and cooling effect on temperature responsive resistance wires.

Other objects and aims of this invention will be apparent from the description.

This invention is best understood in connection with accompanying drawings wherein like reference numerals refer to like parts and in which.

Figure 1:
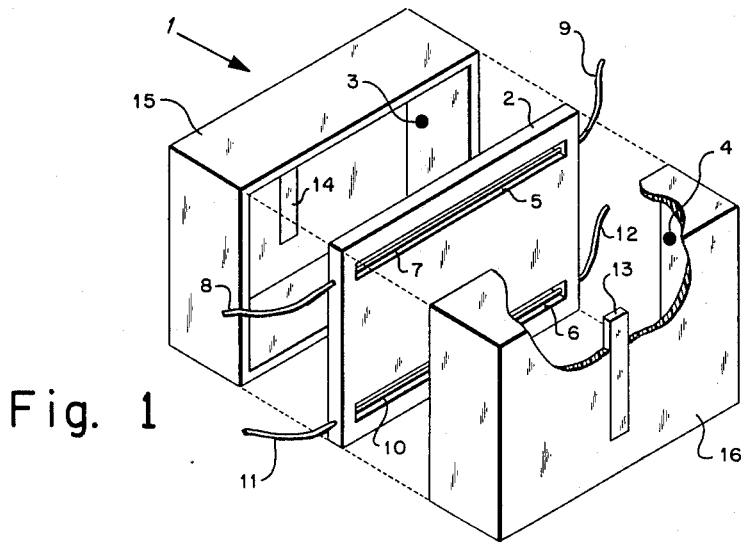
FIGURE 1 is a simplified exploded perspective view of a 1-dimensional embodiment of this accelerometer.
Figure 3:
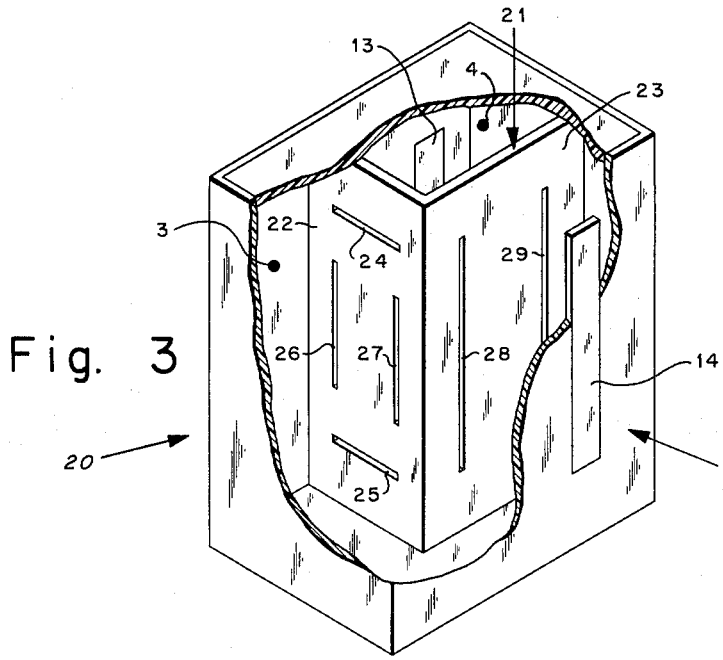
FIGURE 3 is a simplified perspective cut-away view of an embodiment of this invention in a 3-dimensional accelerometer.
Figure 5:
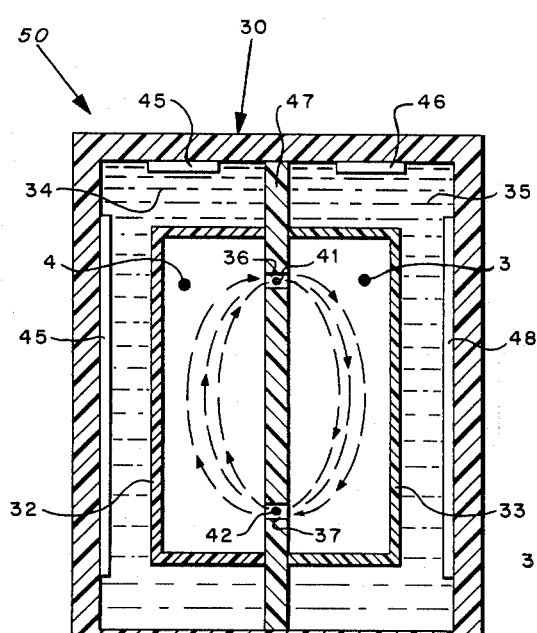
FIGURE 5 is a cross-sectional view of one embodiment of this accelerometer utilizing certain refinements, and illustrating the closed gas circulatory system.

The general operation and construction of this invention is best understood by reference to FIGURES 1 and 5. In FIGURE 1, a 1-dimensional accelerometer is shown generally at 1. The accelerometer consists of two chambers, 15 and 16, separated by a partition or dividing wall, 2. As shown by the phantom lines, the chambers are illustrated as exploded away from the wall to better disclose the structure. The chamber on the left, 15, as shown in FIGURE 1, is filled with a mass of hot gas, 3, and the chamber on the right, 16, is filled with a mass of cold gas 4. The partition 2 has an upper slot or gap 5 connecting the hot gas 3 and the cold gas 4. The partition 2 also has a lower gap or slot 6 which is spaced from and parallel to the upper gap and also connects masses 3 and 4. It is understood that the terms "upper" and "lower" are merely convenient designations for the two slots. As shown in FIGURES 1 and 3, the parallel slots are axially overlapping. The term axis here refers to the long axis of the slot. It is preferable to space the slots as far apart as possible.

An upper resistance wire 7 is positioned parallel to the partition 2 and located within the gap 7. The lower resistance wire 10 is similarly positioned parallel to the partition 2 and within the lower gap 6 so that it is also parallel to upper wire 7. The upper resistance wire 7 is connected to leads 8 and 9. The lower resistance wire is connected to leads 11 and 12. A current is passed through each of the wires 7 and 10.

The positioning of the upper and lower resistance wires with respect to the partition is further clarified in FIG- URE 5. In this figure, the upper resistance wire 36 is located within upper slot 41 and the lower resistance wire is located within lower slot 37. The slots are provided in partition 47. It is seen that the wires are of smaller diameter than the width of the slots and are spaced away from the boundaries of the slots so as to permit the unimpeded flow of gas around the wires. Broadly, the wire may be described as adjacent to the slot and in a thermally cooperating or responsive relationship to the temperature within the slot. The relatively hot mass of gas is shown at 3 and the relatively cold mass of gas is shown at 4.

When the apparatus is operative and an acceleration is present the gases circulate through the slots as shown by the broken arrow-headed lines in FIGURE 5. When the instrument is accelerating in the direction A, as shown in FIGURE 5, the direction of circulation of the gases is as indicated in the drawing. If the instrument is used as a gravity meter, the circulation would be as indicated if the mass whose gravity is to be measured is located above the figure, that is, if $g$ is acting in the direction opposite to that indicated for A.

The mass of the hot gas 3 in the chamber between the slots is less than the mass of the cold gas 4 between the slots. This is due, of course, to the well known phenomenon of the expansion of gases, and consequent decrease in density, as their temperature increases. When an acceleration acts on the instrument parallel to the partition 47 and perpendicular to the wires 41 and 42, it produces a different force on the hot and cold gases because of their different masses and hence produces a circulatory flow of the gases through the slots.

An electric current is passed through each wire and heats it to a desired temperature. Each wire, at this predetermined temperature, has a known or easily determinable resistance. The important aspect is that when there is no acceleration and hence no flow of gases, the resistances of the upper and lower wires are equal. As is well known, the resistance of a conductor is a function of its temperature; the resistance increasing with the temperature. When a flow of gas through the slots occurs, cold gas passes around one wire and hot gas passes around the other wire. In FIGURE 5, under the acceleration as shown, hot gas passes through slot 37 and around wire 42 and cold gas passes through slot 36 and around wire 41. In FIGURE 1, assuming a downward acceleration, the hot gas 3 passes through slot 6 and around resistance wire 10 and the cold gas 4 passes through slot 5 and around resistance wire 7.

Thus, one of the resistance wires is further heated by the flow of a hot gas and the other resistance wire is cooled by the flow of a relatively cold gas. The wire over which the hot gas flows increases its resistance and the wire over which the relatively cold gas flows decreases its resistance. It is seen therefore, that a flow of gas, as is caused by acceleration or gravity, produces a differential between the resistances of the two wires. This differential resistance may be measured and amplified by means described below. The differential is an index of the magnitude of the effect to be measured.

One pair of slots as described comprise an essentially 1-dimensional accelerometer. A 1-dimensional accelerometer is shown in FIGURE 1. An acceleration parallel to the wall and perpendicular to the wires 7 and 10 produces a first order differential in the resistances of the wires. An acceleration parallel to the wall and also parallel to the wires produces no differential effect on the two wires. An acceleration perpendicular to both wall and wires produces no differential effect on the two wires. The last named direction of acceleration does produce an equal flow past each wire causing an equal change in resistance. By algebraically adding the resistance changes of the two wires, the sense and magnitude of this acceleration can be determined, but this is only a second order effect and does not affect any measurement of differential resistance.

In FIGURE 1, the elements 13 and 14 schematically represent temperature sensing and controlling means for the cold chamber 16 and hot chamber 15, respectively. This accelerometer, subjected to any direction of acceleration, will measure only that component acting in an up or down direction.

It is desirable to minimize the mixing of the hot and cold gases during operation. Obviously, rapid mixing will destroy the predetermined temperature differential of the hot and cold gases. Therefore, the chambers should preferably be large to contain a large mass of each gas and the slots should be as narrow as possible to prevent excessive mixing. A minimum dimension of the slot width is determined by the point at which the viscosity effects become large enough to excessively interfere with the gas flow through the slot.

An example of temperatures and dimensions that can be utilized is: the cold chamber at 0° C., the hot chamber at 10° C. and the wire normally at 500° C. The upper temperature of the wire is limited by the material of which it is made: a platinum wire could be maintained at a temperature of about 1700° C.; a tungsten wire could be maintained at a temperature of about 3800° C. The wire diameter could be of the order of 0.001-inch and the slot width of the order of 0.01-inch. The sensitivity of such an accelerometer may be of the order of $1/10^6$ or $1/10^7$ g. Its time lag in responding to an acceleration may be of the order of $1/10^4$ seconds.

The gas used should preferably have a high coefficient of heat. Thus, a gas of relatively high molecular weight is preferable. By putting the gas under high pressure, the heat carrying properties are still further increased and therefore gas under pressure is preferable.

The rate of flow of the gas under acceleration can be further increased by providing a gas of higher molecular weight for the cold chamber and a gas of lower molecular weight for the hot chamber. Thus, the differences in mass between the two quantities of gas will be further increased with an attendant increase in the sensitivity of the instrument.

Instead of the cold chamber being chilled below ambient temperature, it is possible to heat both chambers above the ambient temperature, but to different degrees. It is then possible to maintain the differential temperature by providing thermistors and heaters in each chamber.

Further refinements of the instrument may be made. In FIGURE 5, an improved accelerometer is illustrated. This embodiment shows chambers 32 and 33 surrounded by liquid jackets 34 and 35, respectively. These liquid jackets are maintained at the desired temperature, thus permitting a more even provision of heat to the gas 3 and 4. Thermistors 45 and 46 are provided in each chamber respectively to set the temperature. Heating elements 48 and 49 are provided respectively in each temperature to add heat as required.

Figures 4A, 4B:
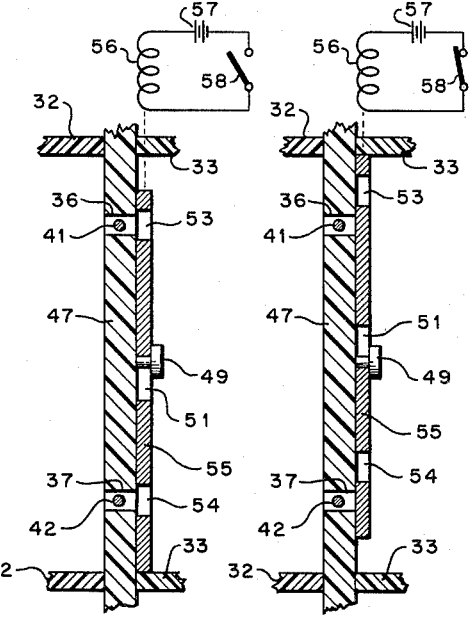
FIGURE 4a is a cross-sectional view in detail of one embodiment of the gap or slot in the open position.
FIGURE 4b is a cross-sectional view in detail of one embodiment of the gap or slot in the closed or inoperative position.

A still further refinement is illustrated in FIGURES 4a and 4b. When the instrument is not in actual operation, the slots may be closed to prevent mixing. A slide 55 is provided adjacent to wall 47. The slide has slots 53 and 54 which correspond in configuration to the slots 36 and 37 in the wall. The slide is vertically movable, being held in place horizontally by pin 49. The slide is free to travel vertically around this pin because of slot 51.

The operation of the slide is schematically illustrated in FIGURES 4a and 4b. A switch 58 closes a circuit so that current from source 57 can activate rheostat 56 and hence move the slide 55. In FIGURE 4a, the slide is shown in its operative position so that its slots 53 and 54 correspond with slots 36 and 37 and permit gas flow. In FIGURE 4b, the slide is shown in its inoperative position, preventing gas flow through slots 36 and 37. It is understood that this structure may be widely varied.

The accelerometer may be made 2-dimensional or 3-dimensional by the addition of an additional pair or pairs of slots. A 3-dimensional accelerometer is illustrated in FIGURE 3 in which the instrument is generally indicated at 20. Right angled partition 21 separates the instrument into two chambers. The partition comprises walls 22 and 23 at right angles to each other. The outer chamber is indicated at 31. The outer chamber contains hot gas 3, temperature controlled by means 14. The inner chamber contains cold gas 4, temperature controlled by means 13.

Three pairs of slots are provided as shown. The pairs are slots 26 and 27; 24 and 25; and 28 and 29. As explained above, each pair is effective in one and only one direction or dimension. Thus, by the arrangement as shown, the instrument of FIGURE 3 is sensitive to acceleration in three dimensions. The omission of one pair of slots would produce a 2-dimensional accelerometer. The information from the instrument may be interpreted in any known manner.

Figure 2A:
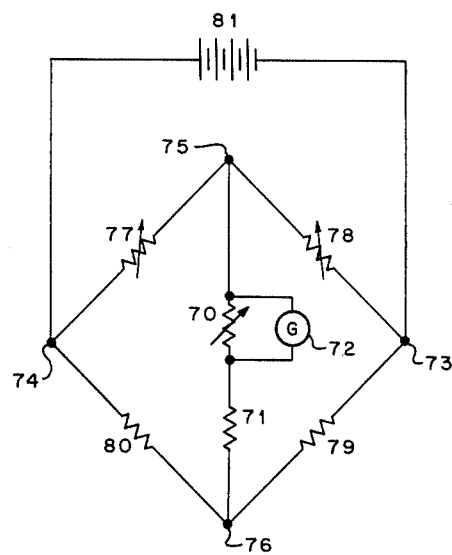
FIGURE 2a is a schematic drawing of a bridge circuit used with this accelerometer.

FIGURE 2a schematically shows one method of measuring the differential resistance. The resistance wires 77 and 78 are incorporated in a Wheatstone bridge and current is supplied from source 81. Fixed resistances 79 and 80 are provided as shown to complete the bridge as is well known. The resistance wires are positioned between points 74 and 75, and 73 and 75 respectively and the known resistances are positioned between points 74 and 76, and 73 and 76 respectively. Fixed resistance 71 and variable resistance 70 are provided between points 75 and 76 so that the circuit may be prebiased in any desired manner. This permits measurement of acceleration or gravity in any desired range. A galvanometer is provided across the variable resistance 70 to indicate the differential resistance and thus indicate the measured acceleration.

Figure 2B:
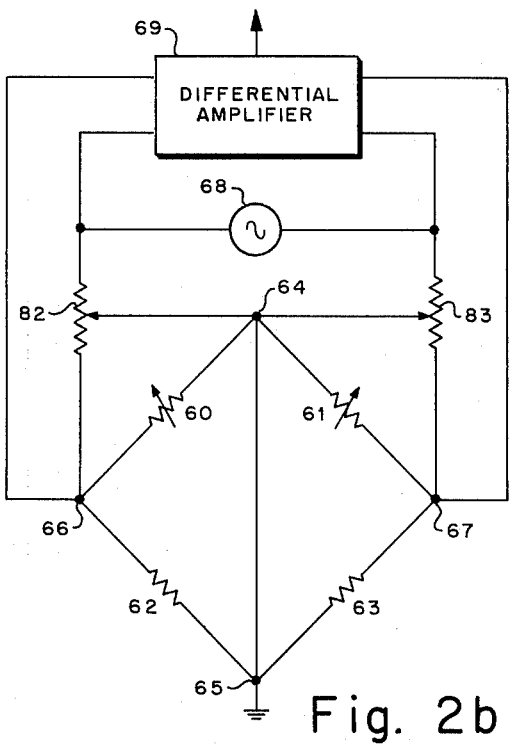
FIGURE 2b is a schematic drawing of a temperature compensated bridge circuit used with this accelerometer.

For further accuracy and sensitivity of the instrument, it is desirable to provide temperature compensation for possible variations in the temperature differential of the two gas chambers. FIGURE 2b schematically illustrates a temperature compensating Wheatstone bridge intended to be used with an alternating current. The resistance wires 60 and 61 are positioned respectively between points 66 and 64, and 67 and 64. The fixed bridge resistances 62 and 63 are positioned respectively between points 66 and 65, and 67 and 65. A source of alternating current is shown at 68 and supplies current across point 66 and 67. Resistance wires 82 and 83 vary respectively with the temperatures in the two chambers, and as shown in FIGURE 2b, act to compensate the circuit for temperature variations in either or both chambers. A differential amplifier 69 is provided as shown to amplify the A.C. differential signal.

Circuits are known in which the frequency of an A.C. signal is varied as a function of resistance. If such a known circuit is used, this instrument may be used as an integrating accelerometer by counting the cycles of the difference frequencies.

It is desirable to keep the wire temperatures constant. By thus making a nulling device of the instrument, as is well known, it is possible to measure larger gas flows without loss of linearity of the signal to the gas flow. It is obviously desirable to provide a linear output signal.

There are many possible combinations of hot and cold gas temperatures and wire temperatures. There are also many possible gases and combinations thereof, and a wide range of pressures, which can be used. The principle of this invention is operative throughout all these possible combinations of conditions, and the measurable effect will be produced at least in some degree. It is obvious that the desired combination of conditions and materials will depend on the particular application. The preferable choice for a given application can be theoretically or experimentally determined by any competent worker in the art.

The temperature of the wire may be equal to, less than, or greater than the temperature of one of the masses of gas. Therefore, what is referred to throughout this description as a hot wire may in reality be a cooled wire. So long as the differentials in temperature described above exist, the apparatus and method will be operative. One advantage of a cooled wire is that less heat supply is required.

Viscosity tends to oppose the flow of gas through the gaps and across the wires. This viscosity of the flowing gas acts to damp the apparatus so that flow will cease upon the removal of acceleration or gravity effects.

The quality of the instrument may be affected by varying the size of the gap. By making the gap very small, the viscosity effects are increased. This produces a slower time constant, and a low sensitivity. On the other hand, this reduction in sensitivity and increase in time constant makes the instrument better suited for measurement of relatively high $g$ accelerations. Thus, a complete installation might include an instrument adapted with small gaps for measuring high accelerations and an instrument equipped with larger gaps for accurately measuring smaller accelerations. It is apparent that the effective ranges of this invention may easily be controlled by varying the appropriate physical characteristics, as has been described.

For increasing the viscous resistance to gas flow through the gaps, the "wire" may be provided in the form of a flat conductive ribbon, positioned in the same manner as the ordinary wire but with its lateral wide dimension extending through the gap from the hot chamber side to the cold chamber side.

The instrument may be simplified for use in applications where its operative life is short and/or where it will be destroyed or lost. In such applications, the gas masses can be initially brought to the desired temperature and then used without further temperature control until mixing becomes too great for operation. Thus, heating or cooling apparatus need not be transported with the instrument during use.

A particularly novel feature of this principle is that the instrument measures flow differentially at two points in a closed system and measures the flow in a direction perpendicular to the direction of acceleration.

The scope of this invention is to be determined by the appended claims.

I claim:

1. A gas flow responsive instrument comprising two chambers, a mass of relatively hot gas in one of said chambers, a mass of relatively cold gas in the other of said chambers, a wall common to and between said chambers and separating said masses, said wall being provided with a pair of parallel slots, said slots being axially overlapping and spaced from each other, a pair of conductors, each said conductor having a resistance which is a function of the temperature of said conductor, each said conductor being adjacent to one of said slots and in a thermally cooperating relationship with the temperature within said slot, and means to measure the differential resistance of said conductors.

2. An instrument as set forth in claim 1 including means to pass a current through said conductors to heat said conductors.

3. An instrument as set forth in claim 2 wherein said measuring means comprises a bridge circuit.

4. An instrument as set forth in claim 2 wherein means are provided to maintain the temperature of said hot gas and said cold gas and means are provided to prevent gas flow through said slots when the instrument is inoperative.

5. An instrument as set forth in claim 4 wherein said measuring means includes temperature compensating means to compensate for differential temperature changes of said gas masses.

6. An instrument adapted to measure acceleration, gravity and to determine verticals with respect to the earth comprising two chambers, a relatively hot gas in one of said chambers, a relatively cold gas in the other of said chambers, a wall common to and between said chambers and separating said gases, said wall being provided with a pair of gaps spaced from each other along the direction of acceleration to be measured, a pair of conductors, each conductor positioned in each of said gaps, each said conductor having a resistance which is a function of the temperature thereof, and means to measure the resistance differential of the said conductors.

7. An instrument as set forth in claim 6 wherein there are a plurality of said apertures and conductors, each aligned in a different direction.

References Cited by the Examiner
UNITED STATES PATENTS 2,455,394  12/1948  Webber _____ 73—514 X
2,552,017   5/1951  Schwartz et al. _____ 73—204

FOREIGN PATENTS 582,246  11/1946  Great Britain.

RICHARD C. QUEISSER, *Primary Examiner.*

DAVID SCHONBERG, *Examiner.*